(12) United States Patent
Ikeda

(10) Patent No.: US 10,712,646 B2
(45) Date of Patent: Jul. 14, 2020

(54) PHOSPHOR WHEEL, LIGHT SOURCE DEVICE, AND PROJECTION DISPLAY APPARATUS

(71) Applicant: Panasonic Intellectual Property Management Co., Ltd., Osaka (JP)

(72) Inventor: Takashi Ikeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/249,826

(22) Filed: Jan. 16, 2019

(65) Prior Publication Data

US 2019/0250489 A1    Aug. 15, 2019

(30) Foreign Application Priority Data

Feb. 9, 2018   (JP) .................. 2018-021678
Oct. 19, 2018  (JP) .................. 2018-197164

(51) Int. Cl.
*G03B 21/20* (2006.01)
*G02B 26/00* (2006.01)
*H04N 9/31* (2006.01)
*F21K 9/64* (2016.01)

(52) U.S. Cl.
CPC ............ *G03B 21/204* (2013.01); *F21K 9/64* (2016.08); *G02B 26/008* (2013.01); *G03B 21/2013* (2013.01); *G03B 21/2073* (2013.01); *H04N 9/3161* (2013.01)

(58) Field of Classification Search
CPC ............ G03B 21/204; G03B 21/2013; G02B 26/008; F21K 9/64; H04N 9/1361
USPC ............................................. 353/31
See application file for complete search history.

(56) References Cited

U.S. PATENT DOCUMENTS

| | | |
|---|---|---|
| 2011/0149549 A1 | 6/2011 | Miyake |
| 2015/0098065 A1 | 4/2015 | Tanaka |
| 2017/0092786 A1* | 3/2017 | Newell .............. G03B 21/16 |
| 2017/0195645 A1* | 7/2017 | Sakata .............. G03B 33/08 |
| 2017/0237953 A1* | 8/2017 | Akiyama ........... H04N 9/3114 353/31 |
| 2019/0137858 A1* | 5/2019 | Hsieh ............... G03B 33/08 |

FOREIGN PATENT DOCUMENTS

| | | |
|---|---|---|
| JP | 2011-129406 | 6/2011 |
| JP | 2014-142369 | 8/2014 |
| JP | 2015-092224 | 5/2015 |
| JP | 2015-138136 | 7/2015 |

\* cited by examiner

*Primary Examiner* — Jerry L Brooks
(74) *Attorney, Agent, or Firm* — Wenderoth, Lind & Ponack, L.L.P.

(57) ABSTRACT

A phosphor wheel of a first exemplary embodiment in the present disclosure includes a base plate, an annular phosphor provided on the base plate, and a reflective coating provided on a partial area of the annular phosphor. Further, a phosphor wheel of a second exemplary embodiment includes a base plate, an annular phosphor layer that is provided on the base plate and constituted by a plurality of phosphor segments, and a reflective coating provided on a partial area of the annular phosphor layer.

16 Claims, 6 Drawing Sheets

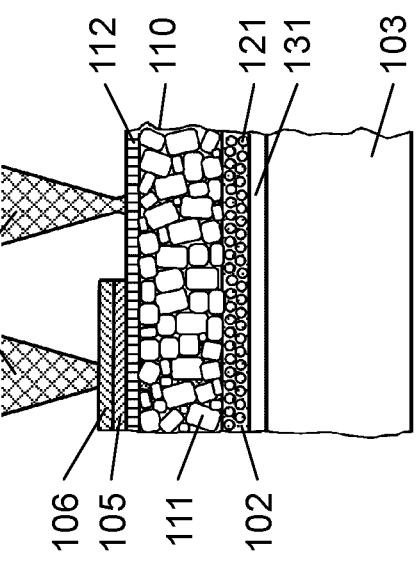
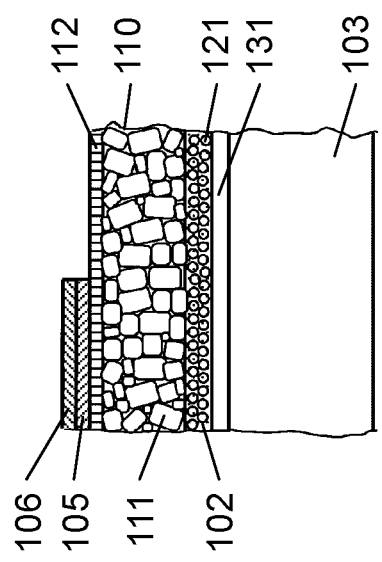
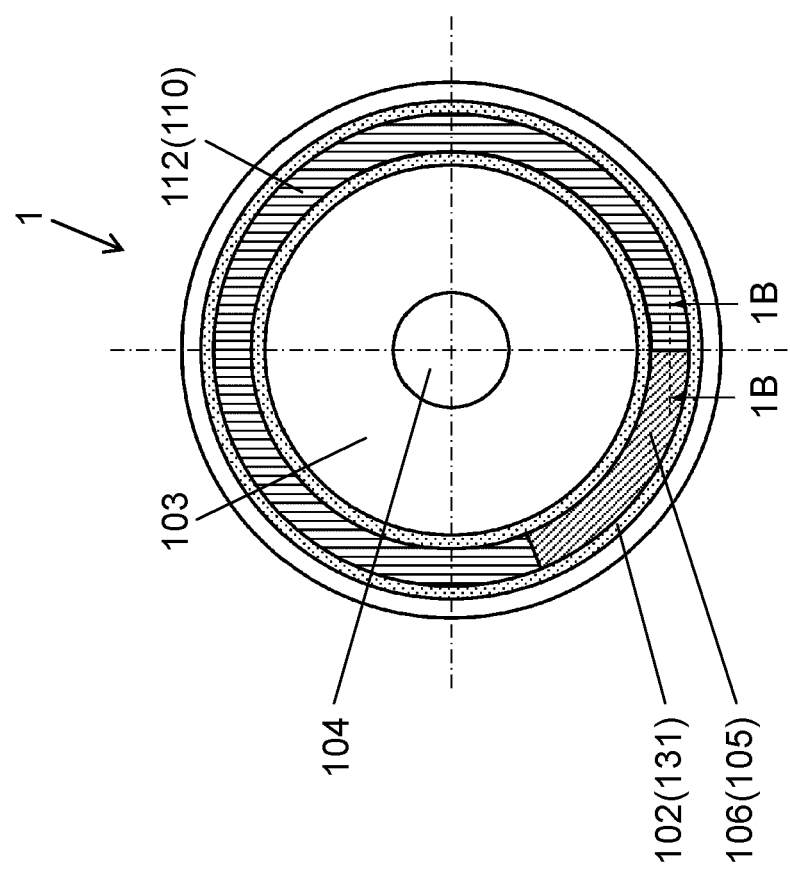

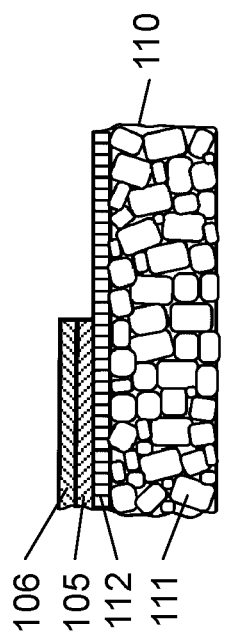
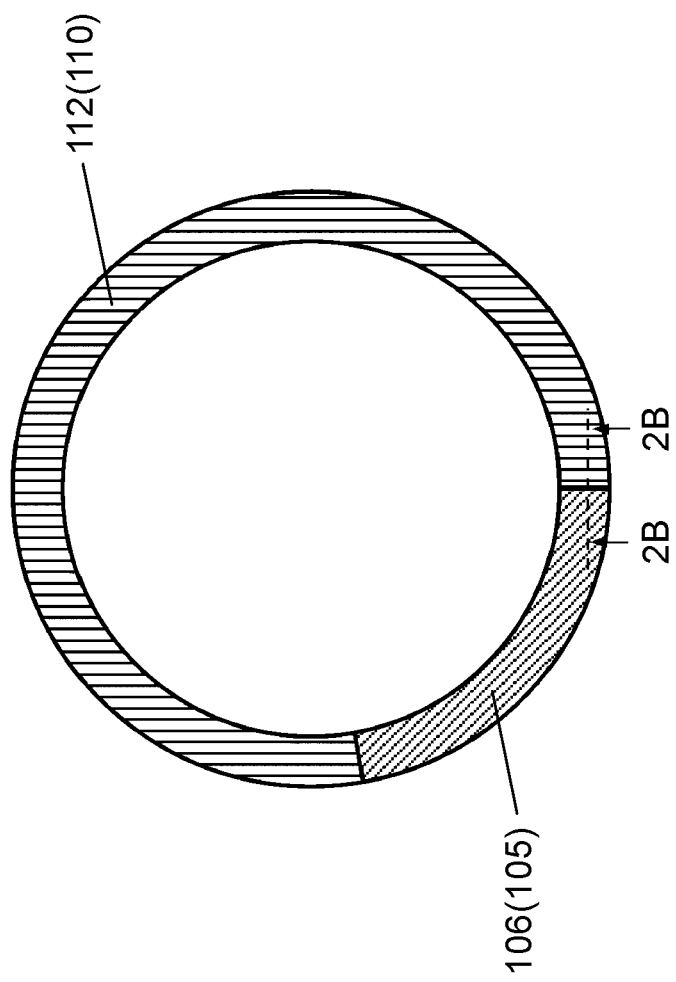

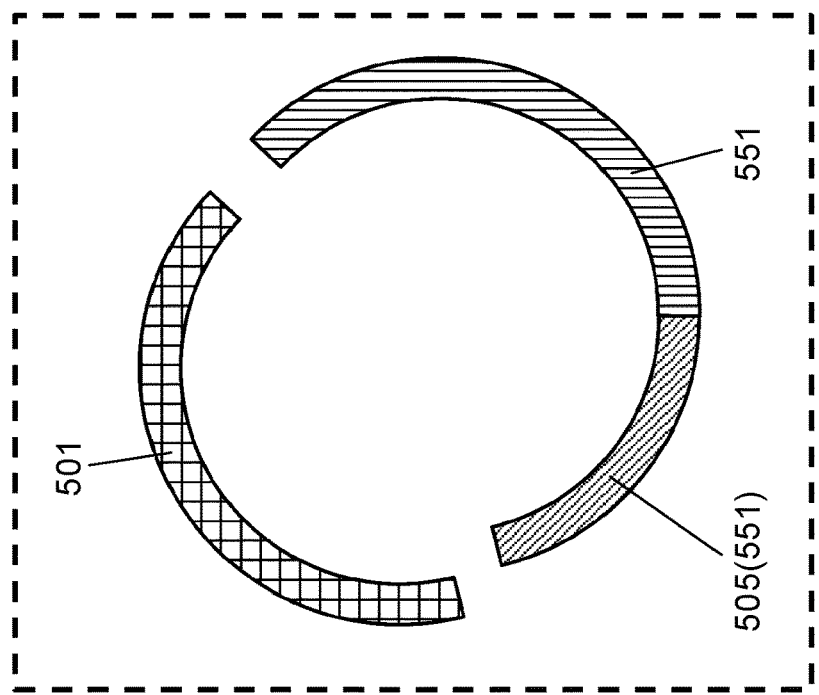
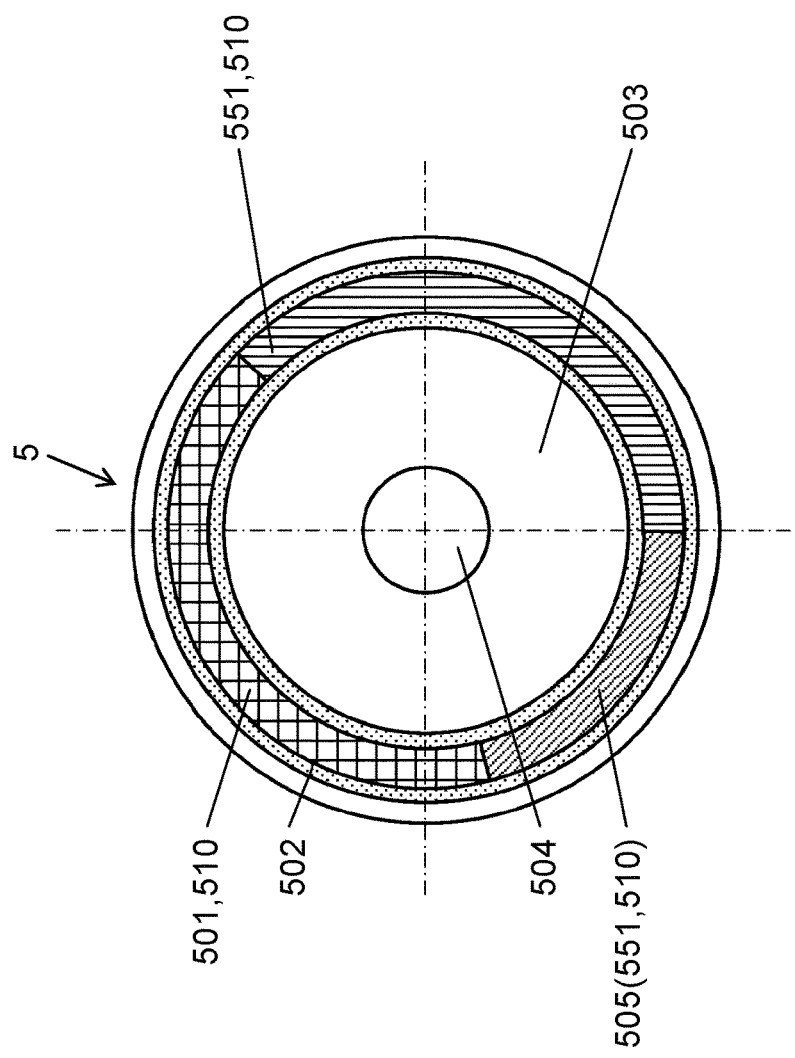
FIG. 4A
FIG. 4B

PHOSPHOR WHEEL, LIGHT SOURCE DEVICE, AND PROJECTION DISPLAY APPARATUS

BACKGROUND

1. Technical Field

The present disclosure relates to a phosphor wheel used for, for example, a light source device of a projection display apparatus.

2. Description of the Related Art

The light source device having a light source and a fluorescent device is disclosed in Patent Literature (Unexamined Japanese Patent Publication No. 2015-092224). The fluorescent device has a base plate, a first reflective coating, a phosphor layer, and a second reflective coating. The first reflective coating is formed on a first portion of the base plate. The phosphor layer is formed on an opposite side of the first reflective coating from the base plate, and emits fluorescence light by excitation light from the light source. The second reflective coating is formed on a second portion of the base plate, and reflects the light from the light source. A surface of the phosphor layer into which the light from the light source is entered, and a surface of the second reflective coating on which the light from the light source is reflected are at substantially the same level.

SUMMARY

The present disclosure provides a phosphor wheel that secures its balance, as a phosphor wheel, to improve the manufacturability and reliability, as well as to increase light-converging efficiency of fluorescence light and reflected light.

A phosphor wheel of a first exemplary embodiment in the present disclosure includes a base plate, an annular phosphor layer provided on the base plate, and a reflective coating provided on a partial area of the annular phosphor layer.

Further, a phosphor wheel of a second exemplary embodiment includes a base plate, an annular phosphor layer that is provided on the base plate and constituted by a plurality of phosphor segments, and a reflective coating provided on a partial area of the annular phosphor layer.

The phosphor wheel in the present disclosure, which has excellent manufacturability and reliability, can increase light-converging efficiency of fluorescence light and reflected light.

BRIEF DESCRIPTION OF DRAWINGS

FIG. 1A is a plan view showing a structure of a phosphor wheel in a first exemplary embodiment;

FIG. 1B is a cross-sectional view of the phosphor wheel taken along line 1B-1B in FIG. 1A;

FIG. 1C is a view for illustrating an effect by using the cross-sectional view shown in FIG. 1B;

FIG. 2A is a view showing a phosphor layer of the phosphor wheel in the first exemplary embodiment;

FIG. 2B is a cross-sectional view of the phosphor wheel taken along line 2B-2B in FIG. 2A;

FIG. 4A is a plan view showing a structure of a phosphor wheel in a second exemplary embodiment;

FIG. 4B is a view showing phosphor segments that constitute a phosphor layer of the second exemplary embodiment;

DETAILED DESCRIPTION OF THE PREFERRED EMBODIMENTS

Figure 3:
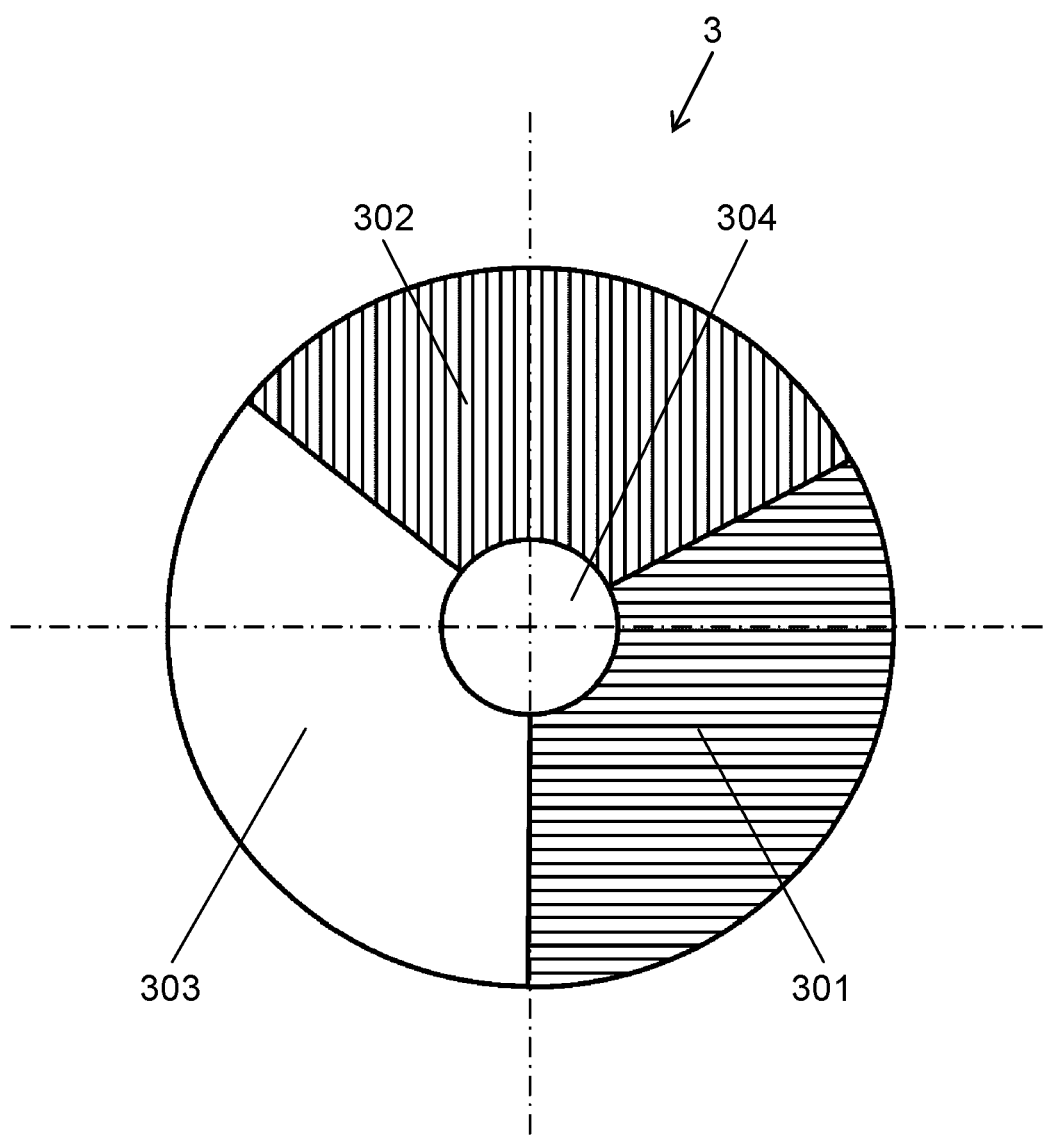
FIG. 3 is a view showing a structure of a color wheel in the first exemplary embodiment.

Hereinafter, exemplary embodiments will be described, in detail, with reference to the drawings as necessary. However, description that is in more detail than necessary is occasionally omitted. For example, detailed description about already well-known matters and overlapped description about the substantially same configurations are occasionally omitted. This is because the following description is avoided from being unnecessarily redundant, and a person skilled in the art is made to easily understand the present disclosure.

Note that, the accompanying drawings and the following description are provided for a person skilled in the art to fully understand the present disclosure, and do not intend to limit the subject matter described in claims.

First Exemplary Embodiment

[1-1 Phosphor Wheel]
[1-1-1 Structure]

Hereinafter, a structure of phosphor wheel 1 in a first exemplary embodiment will be described in detail. FIG. 1A is a plan view of the phosphor wheel. FIG. 1B is a cross-sectional view of the phosphor wheel taken along line 1B-1B in FIG. 1A. FIG. 1C is a view for illustrating an effect by using the cross-sectional view shown in FIG. 1B. FIG. 2A is a plan view of a phosphor layer. FIG. 2B is a cross-sectional view of the phosphor wheel taken along line 2B-2B in FIG. 2A.

As shown in FIG. 1A, phosphor wheel 1 includes phosphor layer 110, disk-shaped base plate 103 on which the phosphor layer 110 is provided, and motor 104 that is attached to a mounting hole provided in the center of base plate 103 to rotate base plate 103.

Phosphor 111, which emits yellow light (i.e., light containing red and green light wavelength), is sintered into an annular shape (ring shape) to form phosphor layer 110. On the all area of one side of phosphor layer 110, anti-reflection coating 112 is formed. Further, on a partial area of anti-reflection coating 112, which is formed on the one side of phosphor layer 110, first reflective coating 105 is formed to reflect blue light. In the present exemplary embodiment, phosphor layer 110 has a thickness of approximately 100 μm to 200 μm. On the other hand, first reflective coating 105 is formed to have a very thin thickness, for example, several μm. In the present exemplary embodiment, diffusion layer 106 is provided on first reflective coating 105. Diffusion layer 106 also has a very thin thickness, for example, several ten μm. Note that, anti-reflection coating 112 has a film thickness of several μm, but it is not limited this.

Ring-shaped phosphor layer 110 is arranged concentrically about the center of base plate 103. The area of base plate 103 to which phosphor layer 110 is to be attached is provided with second reflective coating 131 having an annular shape whose width is slightly wider than a width of phosphor layer 110, but it is not limited this. Phosphor layer 110 is attached on second reflective coating 131 through bonding layer 102. To increase thermal conductivity and reflectance of bonding layer 102, bonding agent of bonding layer 102 is silicone which fill up containing particles 121. As containing particles 121, titanium oxide, aluminum oxide, zinc oxide, and the like are employed.

Anti-reflection coating 112, which is constituted by a dielectric multilayer film, is optimized to minimize surface reflection losses of incident and emitted light that has wavelength regions of excitation light from laser light source 601 (see FIG. 5 and FIG. 6), described later, and fluorescence light that is emitted when phosphor 111 is excited by the excitation light and thereby the excitation light converts wavelength.

First reflective coating 105, which is also constituted by a dielectric multilayer film, is optimized to have high reflectance for any one of wavelength regions of the excitation light from laser light source 601 that enters first reflective coating 105 from convex lens 609 (see FIG. 5 and FIG. 6), described later, and the fluorescence light that is emitted when the excitation light is converts wavelength in phosphor layer 110.

Note that, anti-reflection coating 112 is formed to cover the entire one side of phosphor layer 110, but not limited to this. Anti-reflection coating 112 may be formed on only an area except for a portion at which first reflective coating 105 is to be formed.

Second reflective coating 131 is constituted by a multilayer film in which a reflective coating such as aluminum, silver, or a silver alloy is interposed between protective films. Second reflective coating 131 is optimized to maximize the reflectance thereof in wavelength regions of the excitation light from laser light source 601, described later, and the fluorescence light that is emitted when the excitation light from laser light source 601 convert wavelength in phosphor layer 110.

In the present exemplary embodiment, phosphor layer 110 obtained by sintering phosphor 111 is bonded to second reflective coating 131 of base plate 103 through bonding layer 102, but not limited to this. Without using bonding layer 102, phosphor 111 may be filled up into a resin to obtain a phosphor layer. The phosphor layer may be formed on second reflective coating 131 provided on base plate 103, without using bonding layer 102. After that, anti-reflection coating 112 and first reflective coating 105 may be formed on a surface of the phosphor layer. Further, by using bonding layer 102, phosphor layer 110 may be bonded on base plate 103 having no second reflective coating 131.

[1-1-2 Effect]

Effects of the present exemplary embodiment will be described with reference to FIG. 1C. First, the case where reflective coating 105 is irradiated with excitation light 201 will be described. In this case, the excitation light from convex lens 609, which has entered diffusion layer 106 of phosphor wheel 1 (see FIG. 5 and FIG. 6), is reflected on first reflective coating 105, thereby changing a traveling direction thereof by 180 degrees. After that, the excitation light passes through diffusion layer 106 again, and is emitted to convex lens 609.

Secondly, the case where phosphor layer 110 is irradiated with excitation light 201 will be described. In this case, excitation light 201 from convex lens 609, that has entered anti-reflection coating 112 (see FIG. 5 and FIG. 6) enter in phosphor 111 of phosphor layer 110, in which excitation light 201 convert wavelength and emitted as fluorescence light. The fluorescence light is emitted in every direction.

The fluorescence light that has been emitted to an anti-reflection coating 112 side is emitted to convex lens 609 as it is. Further, the fluorescence light that has been emitted to a base plate 103 side is reflected on bonding layer 102 whose reflectance is increased by containing particles 121, or on second reflective coating 131 formed on the surface of base plate 103. The reflected fluorescence light passes through bonding layer 102, phosphor layer 110, and anti-reflection coating 112 again, and then enters convex lens 609.

The thickness of diffusion layer 106 and first reflective coating 105 is thin. Accordingly, diffusion layer 106 and first reflective coating 105 are formed on base plate 103 such that the surfaces thereof are at substantially the same level, as shown in FIG. 1B or FIG. 1C.

For this reason, a spot that is formed when excitation light 201 enters a face of diffusion layer 106, and a spot that is formed when excitation light 201 enters a face of anti-reflection coating 112 on phosphor layer 110 have substantially the same size. Accordingly, the excitation light that is reflected on first reflective coating 105 and passes through diffusion layer 106, and the fluorescence light that is emitted when the excitation light convert wavelength in phosphor 111 of phosphor layer 110 have substantially the same light-converging efficiency to convex lens 609. As a result, efficiency of the phosphor wheel can be improved.

Further, as shown in FIG. 1A, ring-shaped phosphor layer 110 can be bonded on base plate 103 through bonding layer 102 in axial symmetry about a rotation axis of motor 104. This makes it possible to minimize initial imbalanced quantity and improve manufacturability and reliability of the phosphor wheel.

[1-2 Light Source Device Including a Phosphor Wheel]

[1-2-1 Structure]

Figure 5:
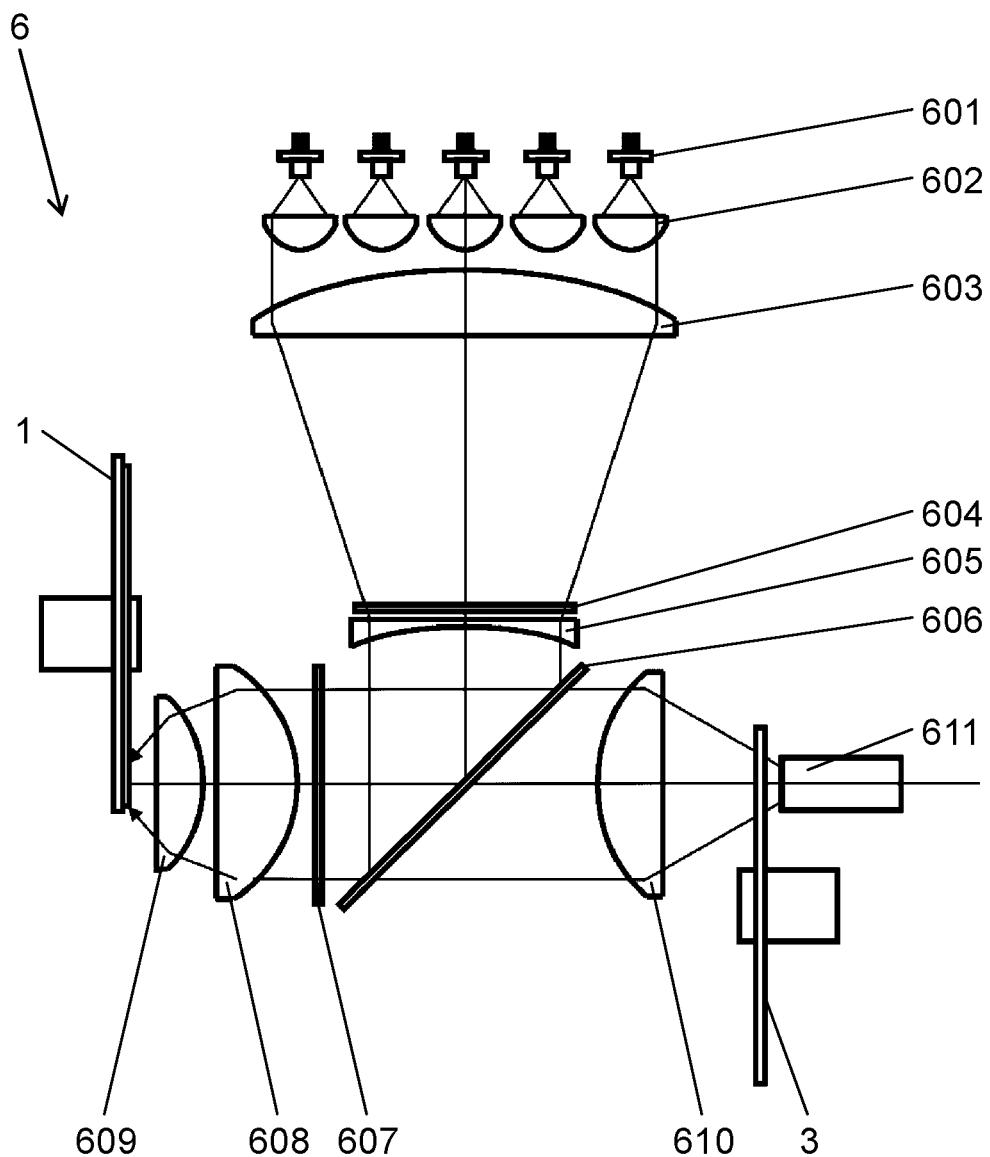
FIG. 5 is a view showing a configuration of a light source device using the phosphor wheel of the first exemplary embodiment.

Next, a light source device in accordance with the first exemplary embodiment will be described with reference to FIG. 5. FIG. 5 is a view showing a structure of the light source device in accordance with the first exemplary embodiment.

As shown in FIG. 5, light source device 6 in accordance with the first exemplary embodiment includes phosphor wheel 1 in accordance with the first exemplary embodiment, and a plurality of laser light sources 601 constituted by semiconductor laser elements. The plurality of laser light sources 601 each are an example of an excitation light source with a blue wavelength region. Since the structure of phosphor wheel 1 has already been described, the overlapped description is omitted.

Further, light source device 6 includes a plurality of collimator lenses 602 each being disposed on a corresponding one of exiting-sides of the plurality of laser light sources 601, convex lens 603, diffuser 604, concave lens 605, wavelength and polarization selective mirror 606, wavelength plate 607, and convex lenses 608 and 609. These optical components are an example of an optical system for guiding light emitted from the plurality of laser light sources 601 to phosphor wheel 1. Light source device 6 further includes convex lens 610, color wheel 3, and rod integrator 611.

The light with a blue wavelength region, which is emitted from each of the plurality of laser light sources 601, is collimated by the plurality of collimator lenses 602 each disposed on a corresponding one of the exiting-sides of the plurality of laser light sources 601. On exiting-sides of the plurality of collimator lenses 602, convex lens 603 is disposed to collect the light from the plurality of laser light sources 601, which is emitted from the plurality of collimator lenses 602, and narrow a light-flux width thereof. The light of which the light-flux width is narrowed by convex lens 603 enters diffuser 604 disposed on an exiting-side of convex lens 603. In diffuser 604, ununiformity of the light flux, which is not canceled by convex lens 603, is reduced.

The light emitted from diffuser 604 enters concave lens 605. Concave lens 605 collimates the light emitted from diffuser 604.

The collimated light emitted from concave lens 605 enters wavelength and polarization selective mirror 606 disposed on an exiting-side of concave lens 605. Wavelength and polarization selective mirror 606, which is disposed obliquely at an angle of 45 degrees to an optical axis, has the following characteristics: S-polarized light with a wavelength region of the blue light, which is emitted from the plurality of laser light sources 601, is reflected, and P-polarized light with the wavelength region of the blue light, which is emitted from the plurality of laser light sources 601, and light with a wavelength region of yellow fluorescence light, which is emitted from phosphor wheel 1, are passed. Note that, for the polarization of laser to be emitted, the plurality of laser light sources 601 are arranged to emit S-polarized light to wavelength and polarization selective mirror 606. Therefore, the light that has been emitted from concave lens 605 to enter wavelength and polarization selective mirror 606 is reflected on wavelength and polarization selective mirror 606.

The light reflected on wavelength and polarization selective mirror 606, which is blue excitation light emitted from the plurality of laser light sources 601, enters wavelength plate 607. Wavelength plate 607 has such a function that a phase of the excitation light with a wavelength region of laser light source 601 is delayed by only $\lambda/4$ in a phase-delay axis direction. At this time, a phase-delay axis of wavelength plate 607 is inclined at 45 degrees to a polarization direction of the incident light from the plurality of laser light sources 601. The excitation light from the plurality of laser light sources 601, which has passed through wavelength plate 607, enters convex lens 608 and convex lens 609 in this order. Therefore, the excitation light enters phosphor wheel 1, with its light flux converged.

Phosphor wheel 1 is disposed such that anti-reflection coating 112 provided on phosphor layer 110 or diffusion layer 106 provided on first reflective coating 105 faces convex lens 609. As mentioned above, since phosphor wheel 1 is rotated by motor 104, phosphor layer 110 and first reflective coating 105 are successively irradiated with the excitation light in time sequential. Thus, phosphor layer 110 and first reflective coating 105 are prevented from being intensively irradiated with the excitation light.

First, the case where phosphor layer 110 is irradiated, in time sequential, with the light from the plurality of laser light sources 601, which is converged by convex lens 608 and convex lens 609, will be described in the following.

The excitation light from the plurality of laser light sources 601 that has entered phosphor layer 110 convert wavelength. In other words, the excitation light from the plurality of laser light sources 601 is converted into fluorescence light whose wavelength region is different from that of the excitation light. Further, for the fluorescence light that has a yellow wavelength region and is emitted from phosphor layer 110, the traveling direction thereof is changed by 180 degrees with respect to the incident light entering phosphor layer 110. As a result, the fluorescence light is emitted to a convex lens 609 side. The fluorescence light that has entered convex lens 609 enters convex lens 608, and is collimated. The collimated fluorescence light passes through wavelength plate 607, and then enters wavelength and polarization selective mirror 606.

Wavelength and polarization selective mirror 606 is disposed obliquely at an angle of 45 degrees to the optical axis of fluorescence light, as mentioned above. Further, wavelength and polarization selective mirror 606 has such characteristics that S-polarized light with a wavelength region of the blue light emitted from the plurality of laser light sources 601 is reflected, and P-polarized light with the wavelength region of the blue light emitted from the plurality of laser light sources 601 and fluorescence light with a yellow wavelength region emitted from phosphor layer 110 (phosphor wheel 1) are passed. Therefore, the fluorescence light that has entered wavelength and polarization selective mirror 606 passes through wavelength and polarization selective mirror 606 as it is.

Secondly, the case where first reflective coating 105 is irradiated, in time sequential, with the light from the plurality of laser light sources 601, which is converged by convex lens 608 and convex lens 609, will be described in the following.

The excitation light from the plurality of laser light sources 601, which enters first reflective coating 105, passes through diffusion layer 106 and is diffused. After that, a traveling direction of the diffused light is changed by 180 degrees on first reflective coating 105. In other words, the diffused light is reflected on first reflective coating 105, and a traveling direction of the reflected light is changed to a convex lens 609 side. The reflected light whose traveling direction has been changed passes through diffusion layer 106 again. Thus, the reflected light is diffused again. The reflected light emitted form diffusion layer 106 enters convex lenses 609 and 608 in this order, and is collimated. The reflected light, which is obtained by reflecting and collimating the excitation light from the plurality of laser light sources 601, enters wavelength plate 607 again.

Wavelength plate 607 has such a function that a phase of the excitation light with a blue wavelength region, which is emitted from the plurality of laser light sources 601, is delayed by only $\lambda/4$ in a phase-delay axis direction, as mentioned above. The phase delay axis of wavelength plate 607 is inclined at 45 degrees. Accordingly, a polarization direction of the excitation light from the plurality of laser light sources 601, which has passed through wavelength plate 607 twice, is rotated at 90 degrees, so that the excitation light is turned into P-polarized light.

In other words, the reflected light is obtained such that the excitation light from the plurality of laser light sources 601 passes through wavelength plate 607 and the polarization direction of the excitation light is rotated at 90 degrees, so that the excitation light is turned into P-polarized light. The reflected light enters wavelength and polarization selective mirror 606.

Wavelength and polarization selective mirror 606 is disposed obliquely at an angle of 45 degrees to an optical axis of the fluorescence light, as mentioned above. Further, wavelength and polarization selective mirror 606 has such characteristics that S-polarized light with a wavelength region of the blue light, which is emitted from the plurality of laser light sources 601, is reflected, and P-polarized light with the wavelength region of the blue light, which is emitted from the plurality of laser light sources 601, and fluorescence light with a yellow wavelength region, which is emitted from phosphor layer 110 (phosphor wheel 1), are passed. Therefore, the reflected light, which has been reflected on first reflective coating 105 of phosphor wheel 1 and entered wavelength and polarization selective mirror 606, passes through wavelength and polarization selective mirror 606 as it is.

The fluorescence light with a yellow wavelength region and the reflected light (excitation light that has a blue wavelength region and is emitted from the plurality of laser light sources 601), which have been emitted from phosphor wheel 1 and passed through wavelength and polarization selective mirror 606, are converged by convex lens 610 and enter color wheel 3 in time sequential.

A structure of color wheel 3 will be described with reference to FIG. 3. Color wheel 3 is constituted by motor 304, red-light transmissible region 301, green-light transmissible region 302, and all-wavelength-light transmissible region 303. Motor 304 rotates color wheel 3. Red-light transmissible region 301 is obtained such that a dielectric multilayer film, which is optimized to pass only light with a red wavelength region, is formed on a glass plate. Green-light transmissible region 302 is obtained such that a dielectric multilayer film, which is optimized to pass only light with a green wavelength region, is formed on a glass plate. All-wavelength-light transmissible region 303 is optimized to maximize transmittance of light with wavelength regions of the excitation light and the fluorescence light. Note that, phosphor wheel 1 and color wheel 3 are synchronized to rotate by using a synchronous circuit, which is not shown.

First, according to the timing when fluorescence light with a yellow wavelength region is emitted from phosphor wheel 1, a spot of the fluorescence light converged by convex lens 610 moves in red-light transmissible region 301, green-light transmissible region 302, and all-wavelength-light transmissible region 303 on color wheel 3, sequentially. Correspondingly, the fluorescence light with a yellow wavelength region that has entered color wheel 3 passes through color wheel 3, and sequentially enters rod integrator 611 as the light with a red, green, and yellow wavelength regions. Within the rod integrator, multiple reflection is performed, so that the light is made uniform and emitted from rod integrator 611.

Secondly, according to the timing when the reflected light with a blue wavelength region is emitted from phosphor wheel 1, a spot of the reflected light converged by convex lens 610 moves in all-wavelength-light transmissible region 303 on color wheel 3. Correspondingly, the light with a blue wavelength region, which has entered color wheel 3, passes through color wheel 3 and enters rod integrator 611. Within the rod integrator, multiple reflection is performed, so that the light is made uniform and emitted from rod integrator 611. In this way, the red, green, yellow, and blue light of which light intensity distribution is made uniform is emitted from rod integrator 611 in time sequential.

Note that, in the above-mentioned configuration, color wheel 3 is disposed on an incidence-side of rod integrator 611, but not limited to this. Color wheel 3 may be disposed on an exiting-side of rod integrator 611.

Further, it is illustrated, by example, that the fluorescence light from phosphor wheel 1 passes through red-light transmissible region 301, green-light transmissible region 302, and all-wavelength-light transmissible region 303, but not limited to this. Color wheel 3 may be configured such that the fluorescence light from phosphor wheel 1 passes through only red-light transmissible region 301 and green-light transmissible region 302. Furthermore, the order of colors in the transmissible regions of color wheel 3 may be changed. Besides, a configuration with no color wheel may be employed.

[1-2-2 Effect]

By using phosphor wheel 1 whose light-converging performance, manufacturability, and reliability are improved, the present exemplary embodiment can provide a highly-efficient light source device.

[1-3 Projection Display Apparatus Using a Light Source Device that Includes a Phosphor Wheel]

[1-3-1 Configuration]

Figure 6:
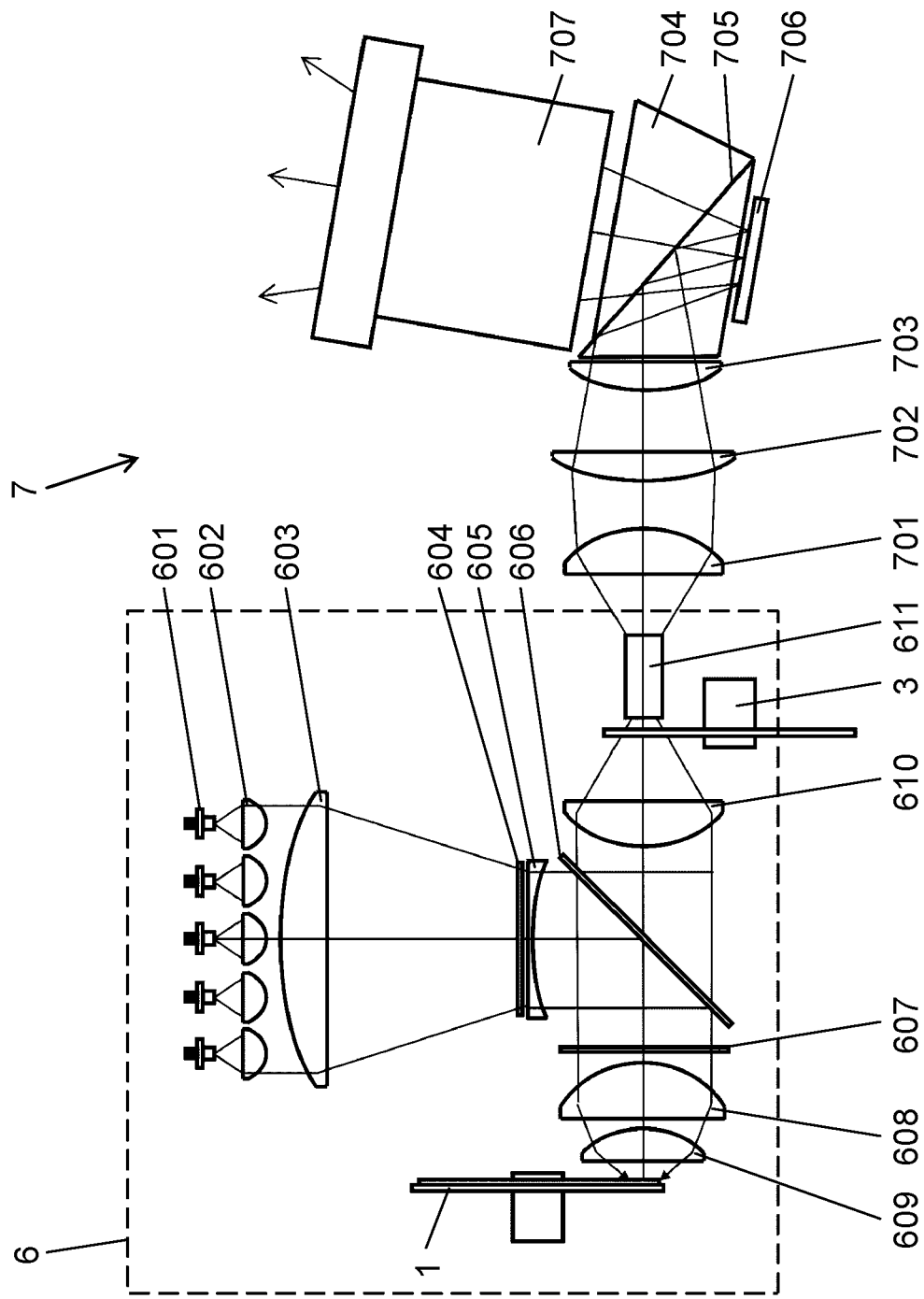
FIG. 6 is a view showing a configuration of a projection display apparatus using the light source device of the first exemplary embodiment.

Next, a projection display apparatus using a light source device that includes the phosphor wheel of the first exemplary embodiment will be described with reference to FIG. 6. FIG. 6 is a view showing a configuration of the projection display apparatus in accordance with the first exemplary embodiment.

Projection display apparatus 7 includes above-mentioned light source device 6, and further includes relay lenses 701, 702, and 703, total internal reflecting prism 704, DMD (Digital Micromirror Device) 706, and projection lens 707.

In the following description, overlapped description about the details of light source device 6 is omitted, and behavior of the red, green, yellow, and blue light, which is emitted from rod integrator 611, will be described.

Each color light emitted from rod integrator 611 is imaged onto DMD 706, described later, by using a relay lens system that is constituted by three convex relay lenses 701, 702, and 703.

The light that has passed through convex relay lenses 701, 702, and 703, which constitute the relay lens system, enters total internal reflecting prism 704. Total internal reflecting prism 704 consists two glass blocks. Between the two blocks, tiny air gap 705 is provided. The light that has entered total internal reflecting prism 704 enters tiny air gap 705 at an angle larger than a critical angle of total reflection, whereby the light is reflected on tiny air gap 705 to enter DMD 706.

DMD 706 is driven by a synchronous circuit and an image circuit (not shown), while being synchronized with the rotation of phosphor wheel 1 and color wheel 3. Each pixel is switched on and off, corresponding to image information. Thus, a reflecting direction of the light that has entered each pixel of DMD 706 is changed for every pixel.

In DMD 706, the light reflected by the pixel in ON state enters total internal reflecting prism 704, and then enters tiny air gap 705 at an angle smaller than a critical angle of total reflection, thereby passing through total internal reflecting prism 704 as it is. The light that has passed through tiny air gap 705 is enlarged and projected on a screen (not shown) by projection lens 707.

[1-3-2 Effect]

By using a light source device that employs phosphor wheel 1 whose light-converging performance, manufacturability, and reliability are improved, the present exemplary embodiment can provide a projection display apparatus that improves the reliability as a product, together with improvement in a brightness.

Second Exemplary Embodiment

[2-1 Phosphor Wheel]

[2-1-1 Structure]

Hereinafter, a structure of phosphor wheel 5 in accordance with a second exemplary embodiment will be described with reference to FIGS. 4A and 4B. FIG. 4A is a plan view showing phosphor wheel 5 in accordance with the second exemplary embodiment. FIG. 4B is a view showing phosphor segments 501 and 551 used for phosphor wheel 5. Herein, phosphor segment 501 is constituted by a fluorescent layer that receives excitation light from laser light source 601 to emit green fluorescence light, and phosphor segment 551 is constituted by a fluorescent layer that receives the excitation light from laser light source 601 to emit red fluorescence light. Phosphor segment 501 and phosphor segment 551 are arranged to form ring-shaped phosphor layer 510.

As shown in FIG. 4B, reflective coating 505 that reflects blue light is formed on a surface of a partial area of phosphor segment 551. Since phosphor layer 510 and reflective coating 505 of phosphor wheel 5 have the same cross-sectional structure as phosphor layer 110 and first reflective coating 105 of phosphor wheel 1 shown in FIG. 2B, the description thereof is omitted.

As shown in FIG. 4A, phosphor wheel 5 is configured such that two phosphor segments 501 and 551, mentioned above, each are bonded, through bonding layer 502, to base plate 503 configured to be rotated by motor 504, and arranged to form a ring shape. In this case, phosphor layer 510, which is formed into a ring shape by using two phosphor segments 501 and 551, is disposed in axial symmetry about a rotation axis of motor 504.

Note that, it is illustrated, by example, that the phosphor layer is configured such that two phosphor segments are formed a 360-degree circular ring, but not limited to this. More than two phosphor segments may be formed a 360-degree circular ring.

In the above-mentioned description, there is illustrated the structure in which reflective coating 505 is partially formed on any one of phosphor segments (herein, phosphor segment 551), but not limited to this. Reflective coating 505 may be partially formed on each of a plurality of phosphor segments.

Further, the ring-shaped (annular) phosphor layer is constituted by phosphor segments that emit red and green fluorescence lights, but not limited to this. For instance, a phosphor segment that emits yellow fluorescence light, and a phosphor segment that emits green fluorescence light may be employed as a phosphor segment that forms the ring-shaped phosphor layer. Alternatively, a phosphor segment that emits yellow fluorescence light, and a phosphor segment that emits red fluorescence light may be employed, or the like. Further, a phosphor segment that emits light with other wavelength regions, such as yellow, may be employed.

Further, like phosphor wheel 1 of the first exemplary embodiment, an anti-reflection coating may be formed on phosphor layer 510, and reflective coating 505 may be formed on the anti-reflection coating as the first reflective coating. In addition to this, a diffusion layer may be further provided on reflective coating 505. Furthermore, like phosphor wheel 1 of the first exemplary embodiment, the second reflective coating may be formed on base plate 503, and phosphor layer 510 may be bonded on the second reflective coating through bonding layer 502.

[2-1-2 Effect]

As mentioned above, reflective coating 505 is provided on a surface of phosphor segment 551, and thereby the surface of reflective coating 505 and the surfaces of phosphor segments 501 and 551 are at substantially the same level. This makes it possible to improve the light-converging efficiency.

Further, as shown in FIG. 4A, phosphor segments 551 and 501 can be arranged to form a ring shape, and bonded to base plate 503 through bonding layer 102 in axial symmetry about a rotation axis of motor 504. This makes it possible to minimize initial imbalanced quantity and improve the manufacturability and reliability.

[2-2 Light Source Device Using a Phosphor Wheel]

In light source device 6 shown in FIG. 5, phosphor wheel 5 in accordance with the second exemplary embodiment can be employed to constitute the light source device, instead of phosphor wheel 1 of the first exemplary embodiment.

The behavior of optical components other than the phosphor wheel is the same as that of light source device 6 described in [1-2 Light source device using a phosphor wheel] of the first exemplary embodiment. Therefore, the description thereof is omitted.

[2-3 Projection Display Apparatus Using a Light Source Device that Includes a Phosphor Wheel]

In projection display apparatus 7 shown in FIG. 6, phosphor wheel 5 in accordance with the second exemplary embodiment can be employed to constitute the projection display apparatus, instead of phosphor wheel 1 of the first exemplary embodiment.

The behavior of optical components other than the phosphor wheel is the same as that of projection display apparatus 7 described in [1-3-1 Projection display apparatus using a light source device that includes a phosphor wheel] of the first exemplary embodiment. Therefore, the description thereof is omitted.

INDUSTRIAL APPLICABILITY

Present disclosure is applicable to a light source device of a projection display apparatus.

What is claimed is:

1. A phosphor wheel comprising:
   a base plate;
   an annular phosphor layer provided on the base plate, the annular phosphor layer including a first area and a second area;
   a reflective coating provided on the first area of the annular phosphor layer; and
   an anti-reflection coating provided on the second area,
   wherein the first area and the second area of the annular phosphor layer are coplanar, and
   wherein the anti-reflection coating is between the first area and the reflective coating.

2. A phosphor wheel comprising:
   a base plate;
   an annular phosphor layer provided on the base plate and comprising a plurality of phosphor segments, the annular phosphor layer including a first area and a second area; and
   a reflective coating provided on the first area of the annular phosphor layer; and
   an anti-reflection coating provided on the second area,
   wherein the first area and the second area of the annular phosphor layer are coplanar, and
   wherein the anti-reflection coating is between the first area and the reflective coating.

3. The phosphor wheel according to claim 1, wherein the annular phosphor layer emits light containing red and green light components, and the reflective coating reflects blue light.

4. The phosphor wheel according to claim 2, wherein
   a first segment of the plurality of phosphor segments emits light containing red and green light components,
   a second segment of the plurality of phosphor segments emits light containing a red or green light component, and
   the reflective coating reflects blue light.

5. The phosphor wheel according to claim 1, further comprising a diffusion layer on the reflective coating.

6. The phosphor wheel according to claim 2, further comprising a diffusion layer on the reflective coating.

7. A light source device comprising the phosphor wheel according to claim 1.

8. A light source device comprising the phosphor wheel according to claim 2.

9. A projection display apparatus comprising the light source device according to claim 7.

10. A projection display apparatus comprising the light source device according to claim 8.

11. The phosphor wheel according to claim 1, wherein the second area is free of the reflective coating.

12. The phosphor wheel according to claim 1, wherein the anti-reflection coating is in direct contact with the first area, the second area, and the reflective coating.

13. The phosphor wheel according to claim 5, wherein the reflective coating and the diffusion layer have a shape that is the same in a plan view.

14. The phosphor wheel according to claim 2, wherein the second area is free of the reflective coating.

15. The phosphor wheel according to claim 2, wherein the anti-reflection coating is in direct contact with the first area, the second area, and the reflective coating.

16. The phosphor wheel according to claim 6, wherein the reflective coating and the diffusion layer have a shape that is the same in a plan view.

\* \* \* \* \*